United States Patent
Vinegar et al.

(10) Patent No.: US 6,419,423 B1
(45) Date of Patent: *Jul. 16, 2002

(54) METHOD FOR REMEDIATING NEAR-SURFACE CONTAMINATED SOIL

(75) Inventors: Harold J. Vinegar; Eric de Rouffignac, both of Houston; Lawrence James Bielamowicz, Bellaire, all of TX (US)

(73) Assignee: University of Texas System, Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/168,769

(22) Filed: Oct. 8, 1998

(51) Int. Cl.⁷ .............................. B09B 3/00; E02D 3/11
(52) U.S. Cl. .............................. 405/128.4; 405/128.15; 405/129.27; 405/258; 210/747
(58) Field of Search .................... 405/128, 52, 131, 405/129, 258; 166/50, 57, 59, 60, 61, 302; 134/21, 25, 26.5, 40 R

(56) References Cited

U.S. PATENT DOCUMENTS

| | | | | |
|---|---|---|---|---|
| 3,181,613 A | * | 5/1965 | Krueger | 166/59 X |
| 4,140,179 A | * | 2/1979 | Kasevich et al. | 166/52 X |
| 4,333,545 A | * | 6/1982 | Roberts | 181/282 |
| 4,346,922 A | * | 8/1982 | Ohtsuga et al. | 285/109 |
| 4,834,194 A | * | 5/1989 | Manchak, Jr. | 405/128 X |
| 4,913,065 A | * | 4/1990 | Hemsath | 110/239 |
| 4,982,788 A | * | 1/1991 | Donnelly | 405/131 X |
| 4,984,594 A | * | 1/1991 | Vinegar et al. | 134/21 |
| 5,011,329 A | * | 4/1991 | Nelson et al. | 405/128 |
| 5,065,819 A | * | 11/1991 | Kasevich | 405/128 X |
| 5,114,497 A | * | 5/1992 | Johnson et al. | 405/128 X |
| 5,163,785 A | * | 11/1992 | Zanelli et al. | 405/277 |
| 5,190,405 A | | 3/1993 | Vinegar et al. | 405/128 |
| 5,193,934 A | * | 3/1993 | Johnson et al. | 405/128 |
| 5,244,310 A | | 9/1993 | Johnson | 405/128 |
| 5,261,765 A | * | 11/1993 | Nelson | 405/128 |
| 5,318,116 A | | 6/1994 | Vinegar et al. | 166/60 |
| 5,435,666 A | * | 7/1995 | Hassett et al. | 405/128 |
| 5,482,402 A | * | 1/1996 | Nelson | 405/128 |
| 5,520,487 A | * | 5/1996 | Decker | 405/278 |

(List continued on next page.)

FOREIGN PATENT DOCUMENTS

DE          3904594    *    8/1990

*Primary Examiner*—Heather Shackelford
*Assistant Examiner*—Jong-Suk Lee
(74) *Attorney, Agent, or Firm*—Eric B. Meyertons; Conley, Rose & Tayon, P.C.

(57) ABSTRACT

A method is provided to remove contaminants from near-surface contaminated soil, the method including the steps of: placing a plurality of metal sheets on the surface above the contaminated soil to form a contiguous cover over at least a portion of the contaminated soil; seal welding adjacent metal sheets together; cutting a plurality of holes in the metal sheet; providing a plurality of heater wells and a plurality of vapor extraction wells into the contaminated soil through the holes cut in the metal sheets; providing vapor extraction wellheads over the vapor extraction wells, the vapor extraction wellheads sealed to the metal sheets; and removing contaminants from the near-surface soil by heating from the heater wells and extracting vapor through the vapor extraction wells. The wells are preferably both heater wells and vapor extraction wells, and the wellheads are preferably bolted to a flange which is welded to the metal sheets to ensure a positive seal at the surface. Insulation is preferably placed over the metal sheets prior to heating of the soil, and a rain cover placed over the insulation to keep rain out of the insulation and away from the soil being heated. The edges of the contiguous cover are preferably sealed by a vertical metal sheet placed into the soil, with a 90 degree angled lip on top, and the lip attached to the edge of the continuous sheet to form the seal.

20 Claims, 4 Drawing Sheets

U.S. PATENT DOCUMENTS

| | | | |
|---|---|---|---|
| 5,551,808 A | * 9/1996 | Sandanasamy et al. | 405/279 |
| 5,660,500 A | * 8/1997 | Marsden, Jr. et al. | 405/128 |
| 5,765,964 A | * 6/1998 | Calcote et al. | 405/128 |
| 5,802,886 A | * 9/1998 | Kim | 68/142 |
| 5,950,383 A | * 9/1999 | Williamson et al. | 52/408 |
| 6,023,554 A | * 2/2000 | Vinegar et al. | 166/60 X |

* cited by examiner

US 6,419,423 B1

METHOD FOR REMEDIATING NEAR-SURFACE CONTAMINATED SOIL

FIELD OF THE INVENTION

The present invention relates to a method for insitu remediation of soil.

BACKGROUND TO THE INVENTION

Removal of contamination from surface and near-surface is often accomplished, by physically removing contaminated soils and subsequently treating the soils at elevated temperatures to vaporize and/or destruct the contamination. This is very expensive, and also exposes the contaminants to the atmosphere as the contaminated soil is being removed and handled. Insitu methods have therefore been proposed, both to reduce the costs of removing the contaminants and as a method to reduce the exposure to the contaminants. Heating soil by conduction from heater wells has been proposed, and a well heater useful in such a process is disclosed in U.S. Pat. No. 5,190,405. This well heater functions as both a means to inject heat, and as a means to remove vapors from the soil. A flexible sheet is placed over the surface in order to seal the surface to vapors that may be drawn into the soils from the surface (and impede the heating process) and to keep water from entering the soil from the surface. Insulation is placed on top of the flexible sheet to reduce heat loss from the system. The flexible sheet of this system must be capable of withstanding the temperatures required for removal of contamination at the surface. If contamination originated from below the surface, such as a buried tank or pipe, then surface temperatures below those required for removal of contaminants may be acceptable, but in many situations, surface temperatures are required that are well above temperatures that can be tolerated by silicone sheets or other pliable sheets. It is desirable to have a heater well design which is tolerant of such high surface temperatures.

U.S. Pat. No. 5,244,310 discloses a system for remediation of near-surface contamination using shallow heater and vapor extraction wells wherein the wells are placed through a frame. An insulated shield covers the frame. This system utilizes the proximity of the vapor extraction wells to the heat injection wells to ensure removal of the contaminants, and does not include any particular seal at the surface to ensure that excessive amounts of air do not penetrate the surface and keep the soil from reaching acceptable remediation temperatures. Air leaking into the contaminated soil also reduces the vacuum that can be applied. A lower pressure within the soil results in more efficient removal of contaminants. It would be preferable to have such a system wherein the surface is sealed in order to both eliminate air intrusion, which cools the soil and increases the amount of vapor to be treated by the vapor extraction system, and also to result in a lower pressure within the soil.

It is therefore an object of the present invention to provide a method for remediation of near-surface contaminants in which the surface is sealed to prevent significant intrusion of air into the contaminated soil. It is another object of the invention to provide such a method wherein heater-vapor extraction wells can be provided at a relatively low cost.

SUMMARY OF THE INVENTION

These and other objects are provided by a method to remove contaminants from near-surface soil, the method comprising the steps of: placing a plurality of metal sheets on the surface above the contaminated soil to form a contiguous cover over at least a portion of the contaminated soil; seal welding adjacent metal sheets together; cutting a plurality of holes in the metal sheet; providing a plurality of heater wells and a plurality of vapor extraction wells into the contaminated soil through the holes cut in the metal sheets; providing vapor extraction wellheads over the vapor extraction wells, the vapor extraction wellheads sealed to the metal sheets; and removing contaminants from the near-surface soil by heating from the heater wells and extracting vapor through the vapor extraction wells. The wells are preferably both heater wells and vapor extraction wells, and the wellheads are preferably bolted to a flange which is welded to the metal sheets to ensure a positive seal at the surface. Insulation is preferably placed over the metal sheets prior to heating of the soil, and a rain cover placed over the insulation to keep rain out of the insulation and away from the soil being heated. The edges of the contiguous cover is preferably sealed by a vertical metal sheet placed into the soil, with a 90 degree angled lip on top, and the lip attached to the edge of the continuous sheet to form the seal.

The method of the present invention forms a relatively inexpensive apparatus for decontamination of soils in a fast and energy efficient manner.

DESCRIPTION OF A PREFERRED EMBODIMENT

Decontamination of soil by thermal conduction and vapor extraction is known, and is described in, for example, U.S. Pat. No. 5,318,116, incorporated herein by reference. The present invention utilizes such a method of decontamination wherein the contaminated soil is heated, insitu, to temperatures at which the contaminants are removed by vaporization and/or thermal destruction. Insitu water is vaporized, aiding in the removal of the contaminants by lowering the partial pressure of the contaminants required for removal of the contaminants by vaporization of the contaminants. Generally, the highest temperatures required are the vapor pressure of the contaminants at the pressures of the soil during decontamination. The present invention provides a method whereby the contaminants are removed by providing an economical and effective seal around the soil to be decontaminated prior to application of heat and vacuum. This seal is provided by covering the contaminated soil with a relatively thin metal sheet, or preferably strips of the thin metal sheet, and sealing the sheets together so that vapor intrusion into the contaminated soil is minimized. The edges of the sheets may be sealed to vertical sheets which extend through the soil downward a distance of at least several inches to possibly several feet, or preferably even below the lowest level of contaminants to be removed. Thus a relatively positive seal is provided around the volume to be decontaminated. This relatively positive seal minimizes migration of contaminants out of the volume being decontaminated, and minimizes flow of air and water into the volume being decontaminated.

Figure 1:
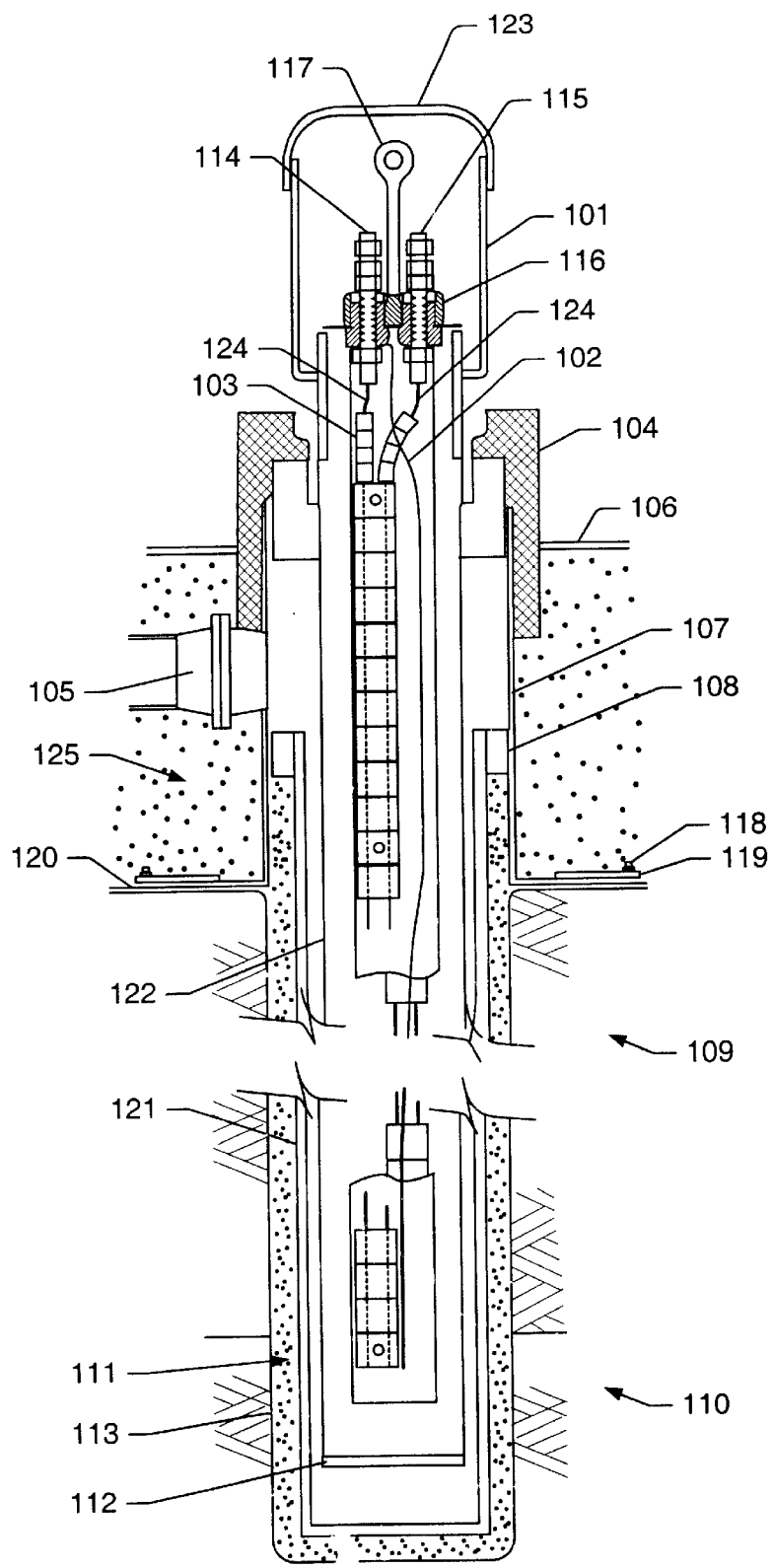
FIG. 1 is a cross section view of a heater-vapor extraction wellbore of the present invention.

Referring now to FIG. 1, a section of a heater-vapor extraction well useful in the present invention is shown. Heater assembly 101 is placed on the wellhead 107. Thermocouple 102 is routed into the well for measurement of the temperature within the well. Electrical power for heater elements 124 is provided through insulators 116 from electrical connections 114 and 115. Electrical element insulators 103, preferably ceramic insulators, provide for expansion of the elements while providing separation of the electrical elements. Wellhead insulation 104 is provided to reduce heat loss from the top of the wellhead. Vacuum connection 105 provides communication from the inside of the wellhead to a vacuum source from which vaporized contaminants and water vapor is removed from the wellhead. Rain shield 106 is placed over thermal insulation 125 to prevent rain from getting to the thermal insulation and the soil being decontaminated. Preventing rain from getting to the soil being decontaminated is important in remediation by the method of the present invention because vaporization of a continuing influx of additional water greatly increases the energy input required, and could prevent temperatures of the soil to be decontaminated from reaching temperatures necessary for decontamination. Although insitu water is also often useful for reduction of the partial pressure of the contaminants and steam distillation of the contaminants from the contaminated soil, the amount of additional water added to the contaminated soil must generally be limited. If additional water is needed in the formation for additional steam distillation of the contaminants from the soil, the amount and distribution of this additional water must be controlled.

A pipe collar 108 supports a sand screen 121 inside of the wellbore. Sand 111 can be provided between the sandscreen and the soil to reduce the amount of soil drawn into the vacuum system.

Wellbore 113 penetrates contaminated soil 109 and additionally penetrates into native soil 110 to ensure that the contaminates are completely removed. End disk 112 is provided at the bottom of a removable heater can 122. A lifting eye 117 is provided to allow for installation and removal of the heater can from the wellbore. Cap 123 can be added over the electrical connections to help keep the electrical connections dry and to prevent the electrical connections from accidentally shorting.

Metal sheet 120 is spread over the surface of the soil to be remediated, and holes are then cut into the metal sheet for placement of the wells. Studs 118 can be used to clamp the wellhead 107 to the metal sheet with flange 119.

Figure 2:
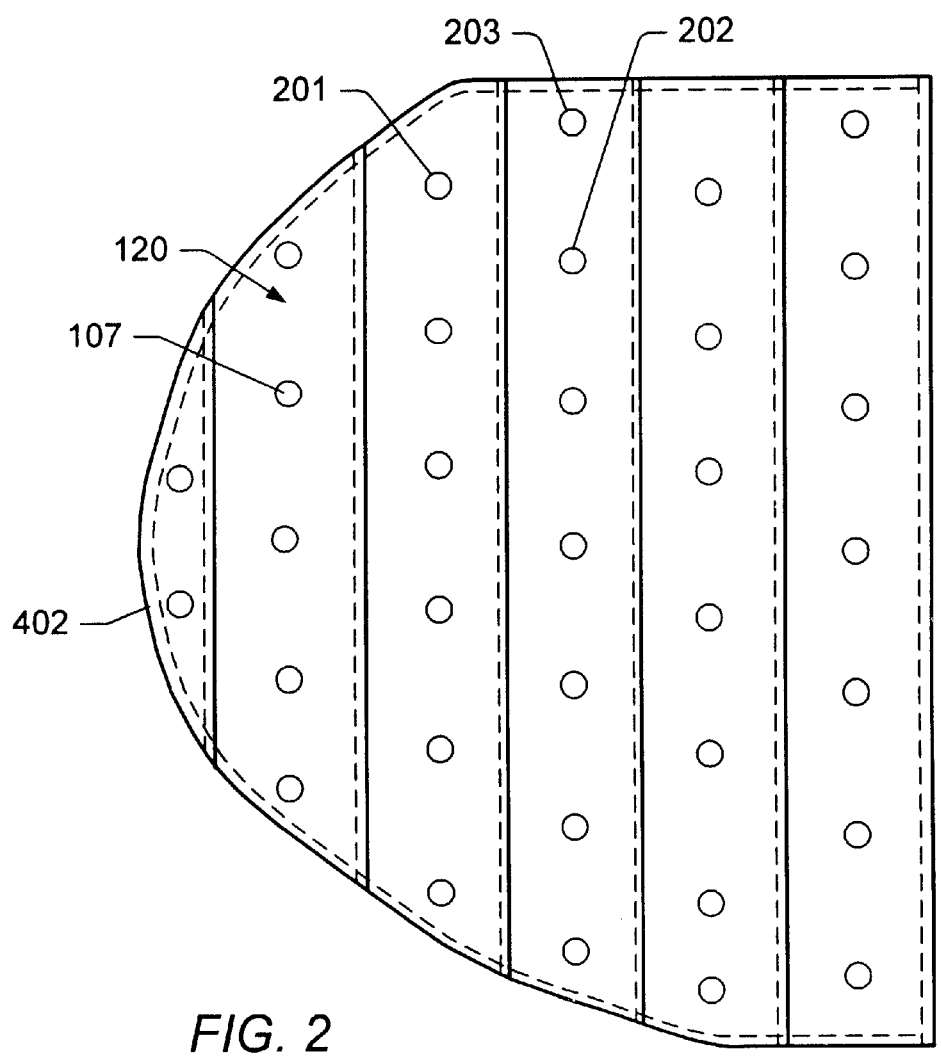
FIG. 2 is a plan view of metal sheets laid out over edge metal sheets to isolate a volume of contaminated soil for remediation by the method of the present invention.

Referring now to FIG. 2, a top view of the metal sheets laid out across soil to be decontaminated is shown. Metal sheets 120 are preferably supplied in strips, so they can be transported in rolls. The metal sheets can be carbon steel if the corrosion environment to which the sheets are exposed during remediation will allow. For example, shim stock may be acceptable. If the corrosion environment to which the sheets are exposed would result in excessive corrosion, stainless steel may be needed. The sheets are preferably thin sheets, such as 0.01 to about 0.03 inches in thickness. The strips are preferably from 4 to about 8 feet in width to allow reasonably easy handling without requiring excessive seal welding to seal the seams between the strips of metal. The relatively thin sheets also allow a considerable amount of conforming to the contour of the surface of the contaminated soil. Even with the flexibility of the metal sheets of the present invention, the surface may be leveled to result in a more efficient remediation operation. For example, low spots may be filled with soil from mounds or hills to flatten the surface. Sides of the metal sheets may be formed into interlocking channels in order to result in a tighter fit and easier seal welding of adjacent metal sheets.

The volume enclosed by the metal sheets and edge sheets may be of regular (square or rectangular) shapes, or may be irregular, depending on variations in the geography and the concentrations of contaminants. Wellheads 107, heater-vapor extraction wells 201, heater wells 202, and vapor extraction wells 203 are shown in a regular pattern through the metal sheets, and sealed to the metal sheets as shown in FIG. 2. Edge metal sheet 402 is shown surrounding the volume of contaminated soil to be remediated. This volume may be the total volume to be remediated at the site, or may be a portion, with adjacent portions to be remediated separately. When a site must be remediated one section at a time (as may be required because of, for example, power availability constraints) preferably adjacent sections are sealed with metal sheets, and vapor collection wellheads are installed to collect vapors generated outside of the volume contained by the edge metal sheets of the section being remediated. Alternatively, the edge metal sheets could be provided in a trench that is wider than required by the edge metal sheets, and the trench filled with an insulating grout to minimize heat transfer from the volume being remediated to contaminated soil surrounding the volume being remediated.

The wellheads 107 are each connected to vapor collection manifold (not shown) and power supply (not shown). Thermocouple leads from each wellbore are also routed to a control system. The control system may be local, or central, or have a local component for control of electrical current to the heater, and a central element for control of the remediation process.

Figure 5:
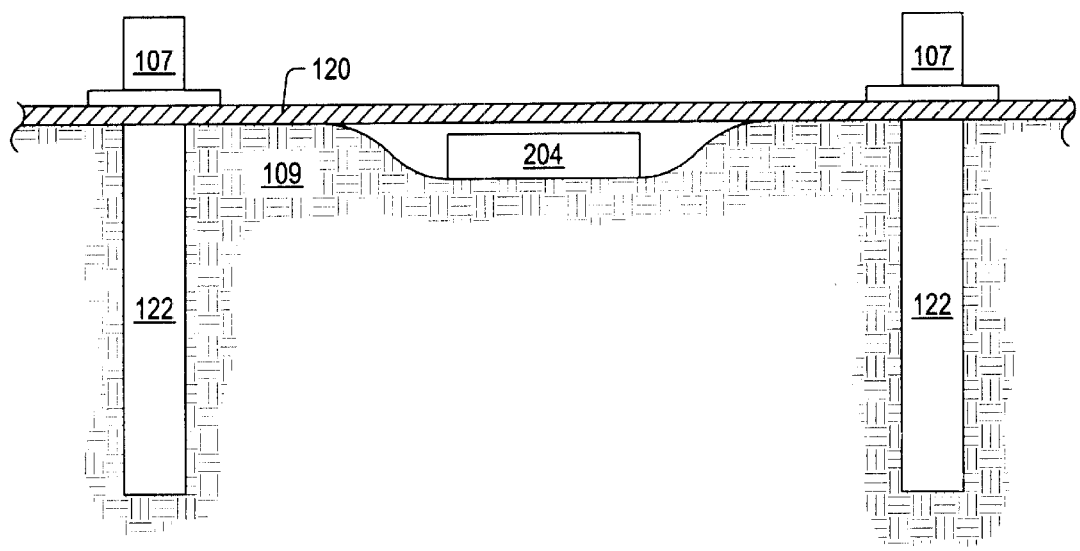
FIG. 5 is a representation of a soil remediation system having a surface heater positioned below metal sheets.
Figure 6:
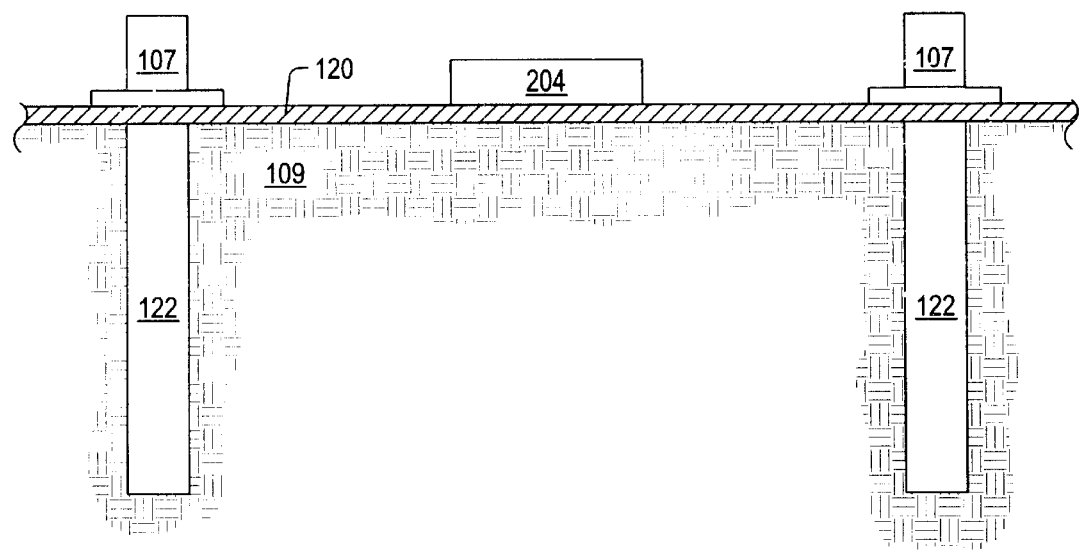
FIG. 6 is a representation of a soil remediation system having a surface heater positioned above metal sheets.

Optionally, thermocouples may be pushed into the soil to be remediated for monitoring of progress of heat fronts through the volume being remediated. Also, additional heaters 204 may be placed, either in shallow holes (as depicted in FIG. 5), or just placed on the surface of the metal sheets (as depicted in FIG. 6), or on the surface to be remediated, at midpoints between the heater wellheads. These additional heaters 204 add heat to the coldest point in the pattern, and significantly reduce the time required to complete removal of contaminants from these regions.

Figure 3:
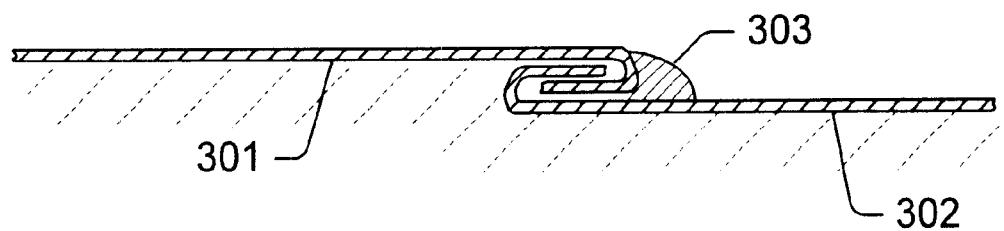
FIG. 3 is a sectional view of a joint between adjacent metal sheets.

Referring now to FIG. 3, a cross section of interlocking channels between metal sheets is shown, with first metal sheet 301 interconnecting with second metal sheet 302 and seal welded with a bead of weld metal 303. These interlocking channels may be readily field fabricated using a sheet metal break. The seal weld is preferable made after the two adjacent sheets are placed on the soil to be decontaminated.

Figure 4:
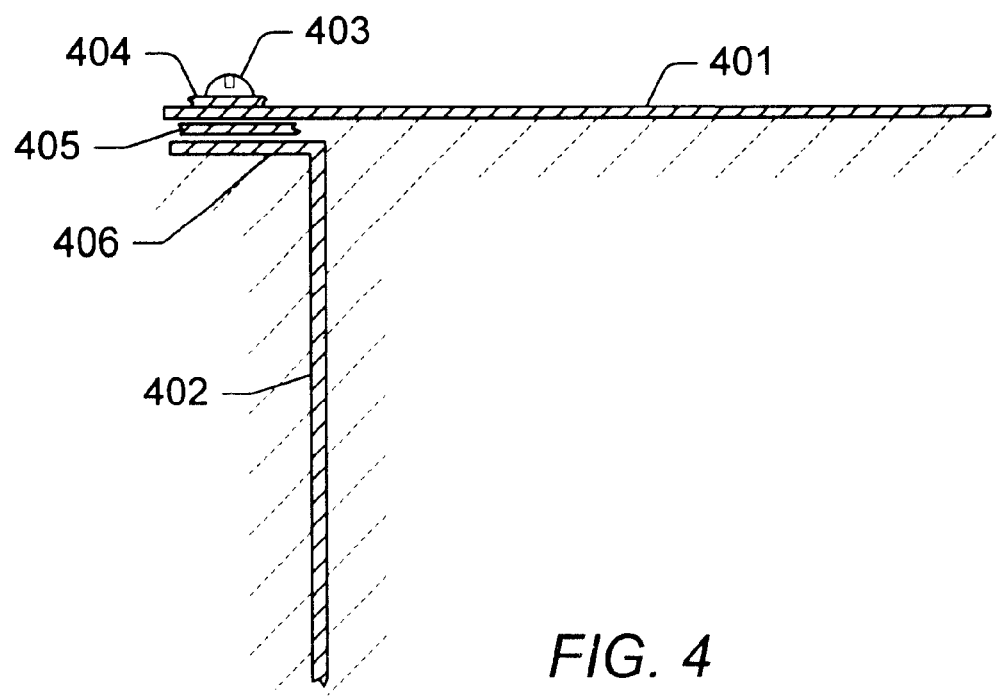
FIG. 4 is a sectional view of the edge of the metal sheets used to isolate a contaminated volume according to the present invention.

Referring now to FIG. 4, an exemplary edge metal sheet to metal sheet joint is shown. A metal sheet 401 extends to a lip 406 on a edge metal sheet 402. The edge metal sheet and the metal sheet are connected, for example, with sheet metal screw 403, shown with a washer 404. Gasket 405 is preferably provided in order to improve the seal between the two metal sheets. The gasket may be, for example, of a garlock material, or a high temperature silicone rubber. The edge metal sheet preferably extends down several inches or feet into the soil, or preferably, to below the lowest level of contaminants to be removed by the method of the present invention. The edge metal sheet may be placed in the soil by digging a trench, which is then back filled with dirt, or grouted into place, after the edge metal sheet is placed in the trench. Alternatively, the edge metal sheet may be pressed into the soil, either in long segments, or one short length at a time. When the edge metal sheets are pressed or pounded into the soil in short segments, they preferably have interlocking edges that can be sealed after adjacent pieces are in place.

The edge metal sheets may optionally be extended down to not only below the lowest level of contaminates to be removed, but may be extended further downward to control flow of subsurface water into the volume of soil to be decontaminated.

What is claimed is:

1. A method of forming a cover for a near surface, in situ thermal desorption soil remediation process, comprising:
   placing a plurality of metal sheets on the surface above contaminated soil;
   forming channels on adjacent metal sheets;
   interlocking the channels together;
   seal welding along an edge of one of the channels to couple the sheets together and form a continuous metal sheet over at least a portion of the contaminated soil;
   forming a plurality of openings in the continuous metal sheet;
   placing the openings around well casings that extend into the contaminated soil; and
   sealing the continuous metal sheet to the well casings so that the continuous metal sheet forms a barrier to inhibit fluid from entering or exiting soil beneath the continuous metal sheet while allowing fluid to exit the soil through selected well casings.

2. The method of claim 1, further comprising placing thermal insulation over the continuous metal sheet.

3. The method of claim 1, further comprising placing a rain barrier over the continuous metal sheet to inhibit water from contacting the continuous metal sheet.

4. The method of claim 1, further comprising forming a trench along a portion of a perimeter of the continuous metal sheet; placing an edge metal sheet in the trench, filling the trench, and coupling the edge metal sheet to the continuous metal sheet.

5. The method of claim 4, wherein coupling the edge metal sheet to the continuous metal sheet comprises attaching a portion of the metal sheet to the continuous metal sheet with fasteners.

6. The method of claim 5, wherein attaching the portion of the metal sheet to the continuous metal sheet comprises forming a lip out of a portion of the metal sheet, placing a gasket between the lip of the metal sheet and the continuous metal sheet, and using the fasteners to couple the metal sheet to the continuous metal sheet.

7. The method of claim 1, further comprising forming a side barrier by driving metal sheet into soil adjacent to a portion of a perimeter of the continuous metal sheet, and coupling the metal sheet to the continuous metal sheet.

8. The method of claim 1, wherein sealing the continuous metal sheet to the well casings comprises attaching the continuous metal sheet to flanges extending from the wells.

9. A method of forming an in situ thermal desorption soil remediation system for treatment of near surface contaminated soil, comprising:
   placing a plurality of wells into the contaminated soil, wherein the wells comprise a plurality of heater wells configured to conductively heat the contaminated soil;
   placing metal sheets over a portion of the contaminated soil;
   sealing the metal sheets together to form a continuous metal sheet;
   forming openings in the continuous metal sheet;
   placing the openings around the wells;
   sealing the continuous metal sheet to the wells to form a barrier to fluid flow into or out of the soil beneath the continuous metal sheet while allowing fluid to exit the soil through selected wells; and
   placing surface heaters at locations between heater wells.

10. The method of claim 9, further comprising placing thermal insulation above the continuous metal sheet.

11. The method of claim 9, wherein sealing the continuous metal sheet to the wells comprises attaching the continuous metal sheet to flanges extending from the wells.

12. The method of claim 9, wherein the surface heaters are placed prior to placing the metal sheets over the portion of the contaminated soil so that the surface heaters are located underneath the metal sheets.

13. The method of claim 9, wherein the surface heaters are placed above the continuous metal sheet.

14. The method of claim 9, wherein placing the metal sheets comprises forming a bend in an edge of a first sheet to create a lip, forming a bend in an edge of a second sheet to create a channel; placing the lip of the first sheet in the channel of the second sheet to interconnect the first sheet and the second sheet.

15. The method of claim 9, further comprising forming a barrier in the ground adjacent to a portion of a perimeter of the continuous metal sheet, and coupling the barrier in the ground to the continuous metal sheet.

16. A near surface, in situ soil remediation system, comprising:
   a plurality of metal sheets configured to be placed on top of contaminated soil, wherein the metal sheets are configured to be seal welded together to form a continuous surface barrier;
   heater wells placed in the ground, wherein well casings of the heater wells pass through openings in the metal sheets and wherein the well casings of the heater wells are sealed to the metal sheets during use;
   suction wells placed in the ground, wherein well casings of the suction wells pass through openings in the metal sheets and wherein the well casings of the suction wells are sealed to metal sheets during use; and
   a plurality of surface heaters, wherein the surface heaters are located between the heater wells during use.

17. The system of claim 16, wherein at least one of the suction wells comprises a heater element configured to heat soil adjacent to the suction well.

18. The system of claim 16, further comprising thermal insulation, wherein the thermal insulation is to be placed above the metal sheets after the metal sheets are seal welded together.

19. The system of claim 16, wherein the surface heaters are placed below the metal sheets.

20. The system of claim 16, further comprising a side barrier placed in the ground around a perimeter of the metal sheets, wherein the side barrier is coupled to the metal sheets.

\* \* \* \* \*